US010922676B2

(12) United States Patent
Soundararajan (10) Patent No.: US 10,922,676 B2
(45) Date of Patent: *Feb. 16, 2021

(54) SYSTEM, METHOD AND ARTICLE OF MANUFACTURE TO FACILITATE A FINANCIAL TRANSACTION FOR PRIMARY AND SECONDARY USERS BASED ON PASSIVE AUTHENTICATION WITHOUT UNLOCKING A MOBILE DEVICE

(71) Applicant: AVANT-GARDE IP LLC, Lorton, VA (US)

(72) Inventor: Ramraj Soundararajan, Lorton, VA (US)

(73) Assignee: AVANT-GARDE IP LLC, Lorton, VA (US)

( * ) Notice: Subject to any disclaimer, the term of this patent is extended or adjusted under 35 U.S.C. 154(b) by 249 days.

This patent is subject to a terminal disclaimer.

(21) Appl. No.: 16/285,188

(22) Filed: Feb. 25, 2019

(65) Prior Publication Data

US 2019/0188683 A1 Jun. 20, 2019

Related U.S. Application Data

(63) Continuation of application No. 13/896,321, filed on May 16, 2013, now Pat. No. 10,217,103.

(51) Int. Cl.
G06Q 40/00 (2012.01)
G06Q 20/32 (2012.01)
G06Q 20/40 (2012.01)

(52) U.S. Cl.
CPC ....... *G06Q 20/3274* (2013.01); *G06Q 20/322* (2013.01); *G06Q 20/40145* (2013.01)

(58) Field of Classification Search
CPC ............. G06Q 20/3274; G06Q 20/322; G06Q 20/40145
See application file for complete search history.

(56) References Cited

U.S. PATENT DOCUMENTS 8,156,128 B2 4/2012 Ramer et al.
8,230,016 B1 7/2012 Pattan et al.
(Continued)

FOREIGN PATENT DOCUMENTS

EP 2428906 A1 3/2012
GB 2491220 A 11/2012
(Continued)

OTHER PUBLICATIONS

Bianchi et al: "The Phone Lock: Audio and Haptic Shoulder-Surfing Resistant PIN Entry Methods for Mobile Devices", Proceedings of the 5th International Conference on Tangible and Embedded Interaction 2011, Funchal, Madeira, Portugal. (Year: 2011).*

(Continued)

*Primary Examiner* — Edward J Baird
(74) *Attorney, Agent, or Firm* — IP Authority, LLC (57) ABSTRACT

A profile is maintained in a mobile device for storing authentication data associated with a primary user of a mobile device, and at least one secondary user that is authorized to use the mobile device. When the mobile device is at a business location, the secondary user is passively authenticated, and upon successful authentication: an image is displayed over a portion of a default lock screen wallpaper when the mobile device is in a screen locked state, wherein the image contains a scanning code, and a financial transaction (e.g., a cloud-based transaction) is facilitated at the business location based on the scanning code without unlocking the mobile device, wherein the financial transaction associated with a financial account of the primary user. Power is conserved in the mobile device by not unlocking it at the business location to conduct the financial transaction.

20 Claims, 8 Drawing Sheets

(56) References Cited

U.S. PATENT DOCUMENTS

| | | |
|---|---|---|
| 8,660,965 B1 | 2/2014 | Bickerstaff |
| 8,666,895 B2 | 3/2014 | Grigg et al. |
| 8,676,273 B1 | 3/2014 | Fujisaki |
| 8,688,492 B2 | 4/2014 | Kruglick |
| 8,910,274 B2 | 12/2014 | Sanders |
| 8,914,875 B2 | 12/2014 | Matus |
| 2004/0267663 A1 | 12/2004 | Kams |
| 2006/0160617 A1 | 7/2006 | Hansen et al. |
| 2007/0300063 A1 | 12/2007 | Adams et al. |
| 2008/0248815 A1 | 10/2008 | Busch |
| 2009/0119527 A1 | 5/2009 | Kim |
| 2009/0201126 A1 | 8/2009 | Ikeguchi |
| 2009/0307139 A1 | 12/2009 | Mardikar |
| 2010/0125509 A1 | 5/2010 | Kranzley |
| 2010/0330953 A1 | 12/2010 | Rogel |
| 2011/0251910 A1 | 10/2011 | Dimmick |
| 2012/0011561 A1 | 1/2012 | Courtney et al. |
| 2012/0054046 A1* | 3/2012 | Albisu ................ G06Q 20/385 705/16 |
| 2012/0060123 A1 | 3/2012 | Smith |
| 2012/0095911 A1 | 4/2012 | Ibasco et al. |
| 2012/0185066 A1 | 7/2012 | Kern et al. |
| 2012/0185398 A1* | 7/2012 | Weis ................ G06Q 20/401 705/75 |
| 2012/0197743 A1 | 8/2012 | Grigg et al. |
| 2012/0223890 A1 | 9/2012 | Borovsky |
| 2012/0233571 A1* | 9/2012 | Wever ................ G06F 3/048 715/835 |
| 2013/0031623 A1 | 1/2013 | Sanders |
| 2013/0050250 A1 | 2/2013 | Brinda et al. |
| 2013/0069962 A1 | 3/2013 | Nealer et al. |
| 2013/0080964 A1 | 3/2013 | Shigeta |
| 2013/0110678 A1 | 5/2013 | Vigier et al. |
| 2013/0256403 A1* | 10/2013 | MacKinnon Keith ................ G06Q 20/42 235/375 |
| 2013/0282193 A1 | 10/2013 | Tyagi et al. |
| 2013/0317835 A1* | 11/2013 | Mathew ................ G16H 20/10 705/2 |
| 2014/0033273 A1 | 1/2014 | Rathbun |
| 2014/0040035 A1 | 2/2014 | Cusack |
| 2014/0058862 A1 | 2/2014 | Celkonas |
| 2014/0189578 A1 | 7/2014 | Shuttleworth et al. |
| 2014/0244507 A1 | 8/2014 | Udd |
| 2014/0267064 A1 | 9/2014 | Lu |
| 2014/0289683 A1 | 9/2014 | Park |
| 2014/0304280 A1 | 10/2014 | Oursbourn |
| 2014/0310174 A1 | 10/2014 | Heeter |
| 2014/0323121 A1 | 10/2014 | Kim et al. |
| 2018/0130548 A1 | 5/2018 | Fisher |

FOREIGN PATENT DOCUMENTS

| | | |
|---|---|---|
| WO | 2012072808 A1 | 6/2012 |
| WO | 2013177391 A2 | 12/2012 |

OTHER PUBLICATIONS

S. Aguinaga et al., "Method for Privacy-Protecting Display and Exchange of Emergency Information on Mobiles Devices," 2012 International Conference on Collaboration Technologies and Systems (CTS), May 21-25, 2012, Denver, CO, 4pgs.

A. Ajadaan et al., "QR-Codes for the Chronically Homeless," CHI 2008 Proceedings—Student Design Competition, Apr. 5-10, 2008, Florence, Italy, pp. 3879-3883.

"Apple buys into fingerprint recognition with AuthenTec deal," biometric Technology, Sep. 2012, 1pg.

L. Beighley, "Visual Quickstart Guide iPhone 5: Chapter 4: Using Your iPhone as a Phone," Peachpit Press, 31pgs.

T. Caldwell, "Locking down the e-wallet," Computer Fraud & Security, Apr. 2012, pp. 5-8.

A. Formiga et al., "An Assessment of Data Matrix Barcode Recognition under Scaling, Rotation and Cylindrical Narping," SACC'11, Mar. 21-25, 2011, TaiChung, Taiwan, pp. 266-267.

T. Hao et al., "COBRA: Color Barcode Streaming for Smartphone Systems," MobiSys'12, Jun. 25-29, 2012, Low Wood Bay, Lake District, UK, pp. 85-97.

T. Hao et al., "Demo: A Barcode Streaming System for Smartphones," MobiSys'12, Jun. 25-29, 2012, Low Wood Bay, Lake District, UK, p. 451.

R. Kemp, "Mobile payments: Current and emerging regulatory and contracting issues," Computer Law & Security Review, v29, 2013, pp. 175-179.

A. Kemshall, "Why mobile two-factor authentication makes sense," Network Security, Apr. 2011, pp. 9-12.

Y. Kristian et al., "Utilizing GPS and SMS for Tracking and Security Lock Application on Android Based Phone," Procedia—Social and Behavioral Sciences, v57, 2012, pp. 299-305.

R. Law, "Using Quick Response Codes for Student Interaction During Lectures," ITiCSE'12, Jul. 3-5, 2012, Haifa, Israel, p. 401.

P. Ljungstrand et al., "WebStickers: Using Physical Objects as WWW Bookmarks," CHI 99, May 15-20, 1999, pp. 332-333.

T. Rosa, "NFC on Mobile: on the Real Security of Mobile Payments," CARDS 2012, Oct. 16-17, 2012, Prague, Czech Republic, 95 pgs.

T. Rosa, "Mobile Devices Security: On Practical Risks of NFC Payments," Mobile Payments 2012, Prague, Czech Republic, 51 pgs.

Computer Weekly News: "QUALCOMM Incorporated; Patent Issued for Mobile Device Having Increased Security That is Less Obtrusive," Atlanta, Apr. 18, 2013, 3pgs.

* cited by examiner

SYSTEM, METHOD AND ARTICLE OF MANUFACTURE TO FACILITATE A FINANCIAL TRANSACTION FOR PRIMARY AND SECONDARY USERS BASED ON PASSIVE AUTHENTICATION WITHOUT UNLOCKING A MOBILE DEVICE

RELATED APPLICATIONS

This application is a continuation of U.S. application Ser. No. 13/896,321 filed May 16, 2013, pending.

BACKGROUND OF THE INVENTION

Field of Invention

The present invention relates generally to the field of mobile-based financial transactions. More specifically, the present invention is related to a system, method and article of manufacture to facilitate a financial transaction at a business location without unlocking a mobile device.

Discussion of Related Art

It is well known in the art to utilize a mobile device, such as a cellular phone, to conduct financial transactions. As an example, a mobile device can be used to pay for financial transaction at a retail establishment. One such example is discussed below to note some of the problems associated with the prior art in conducting such financial transactions.

A retail establishment, e.g., ABC Coffee Shop, may have a software (may also be called an application or app) that a user is able to download on his/her mobile device. Once the software is downloaded and installed by the user of the mobile device, the user can then power up/open the mobile device, click on an icon representative of the software, and run the software on the mobile device, which may display, as part of the running software, a scannable barcode. Users are, therefore, able to use the software installed on the mobile device to conduct a transaction at the retail establishment, which in this example is the ABC Coffee Shop, by having someone at the retail establishment scan the barcode, which allows the user to purchase an item (or items) that he/she desires to buy.

A problem with this scenario is that the user has to go through numerous steps in order to access the software and pay for a purchase, which starts by unlocking the phone, finding the right page having the icon representative of the desired software, clicking on the icon for the desired software, navigating within the software to the appropriate location to load up the barcode that may be used for payment, and presenting the barcode to the retail establishment. This process is time consuming and is also error-prone.

This problem is further compounded for users with numerous software applications that are currently installed on their mobile device, which makes it even more difficult and time consuming to locate and run the software. One mechanism provided for in various mobile devices is the ability to search for a software among the list of installed software. But, even this approach requires the user to unlock the phone, type the first few characters of the software name (if the user can remember the name) and find an appropriate match in the results for the software corresponding to the retail establishment, i.e., the ABC Coffee Shop, run the software, and navigate within the software to the appropriate portion of the software that deals with conducting a transaction. This is even more time consuming than the scenario discussed previously and process is also error-prone.

Additionally, there is no non-intrusive way to authenticate the user as an authorized person to use the mobile device in such a financial transaction. The prior art provides intrusive mechanisms to verify a user's identity where, for example, a user may be asked to provide a pin code as an input prior to proceeding with a financial transaction.

Embodiments of the present invention are an improvement over prior art systems and methods.

SUMMARY OF THE INVENTION

In one embodiment, the present invention provides a method to conserve power in a mobile device comprising: (a) maintaining, in the mobile device, a profile storing authentication data associated with: (1) a primary user of a mobile device, and (2) at least one secondary user that is authorized to use the mobile device; (b) identifying the mobile device is at a business location; (c) passively authenticating the at least one secondary user, and upon successful authentication: (c1) displaying an image over a portion of a default lock screen wallpaper when the mobile device is in a screen locked state, wherein the image contains a scanning code, (c2) facilitating a financial transaction at the business location based on the scanning code without unlocking the mobile device, the financial transaction associated with a financial account of the primary user; (d) wherein power is conserved in the mobile device by not unlocking it at the business location to conduct the financial transaction, and (e) wherein each of the financial transaction is cloud-based, wherein a payment provider automatically covers a cost of a purchase associated with the financial transaction with issuer linked funds, and wherein the payment provider charges a cloud-linked user account in a card-not-present environment.

In another embodiment, the present invention provides a mobile device comprising: a processor; a display; storage storing computer readable programmable code, which when executed by the processor implements a method to conserve power in the mobile device having a lock screen wallpaper, the storage comprising computer readable program code to: (a) maintain, in the mobile device, a profile storing authentication data associated with: (1) a primary user of a mobile device, and (2) at least one secondary user that is authorized to use the mobile device; (b) identify the mobile device is at a business location; (c) passively authenticate the at least one secondary user, and upon successful authentication: (c1) display an image over a portion of a default lock screen wallpaper when the mobile device is in a screen locked state, wherein the image contains a scanning code, (c2) facilitate a financial transaction at the business location based on the scanning code without unlocking the mobile device, the financial transaction associated with a financial account of the primary user; (d) wherein power is conserved in the mobile device by not unlocking it at the business location to conduct the financial transaction, and (e) wherein each of the financial transaction is cloud-based, wherein a payment provider automatically covers a cost of a purchase associated with the financial transaction with issuer linked funds, and wherein the payment provider charges a cloud-linked user account in a card-not-present environment.

In yet another embodiment, the present invention provides a method to conserve power in a mobile device comprising: (a) maintaining, in the mobile device, a profile storing authentication data associated with: (1) a primary user of a mobile device, and (2) at least one secondary user that is authorized to use the mobile device; (b) identifying the mobile device is at a business location; (c) passively authenticating the at least one secondary user, and upon successful authentication: (c1) displaying an image over a portion of a default lock screen wallpaper when the mobile device is in a screen locked state, wherein the image contains a scanning code, (c2) facilitating a financial transaction at the business location based on the scanning code without unlocking the mobile device, the financial transaction associated with a financial account of the primary user, and (c3) upon successful completion of the financial transaction, replacing the image with another image showing the scanning code and a balance left on the financial account of the primary user; (d) wherein power is conserved in the mobile device by not unlocking it at the business location to conduct the financial transaction, and (e) wherein each of the financial transaction is cloud-based, wherein a payment provider automatically covers a cost of a purchase associated with the financial transaction with issuer linked funds, and wherein the payment provider charges a cloud-linked user account in a card-not-present environment.

In another embodiment, the present invention provides a mobile device comprising: a processor; a display; storage storing computer readable programmable code, which when executed by the processor implements a method to conserve power in the mobile device having a lock screen wallpaper, the storage comprising computer readable program code to: (a) maintain, in the mobile device, a profile storing authentication data associated with: (1) a primary user of a mobile device, and (2) at least one secondary user that is authorized to use the mobile device; (b) identify the mobile device is at a business location; (c) passively authenticate the at least one secondary user, and upon successful authentication: (c1) display an image over a portion of a default lock screen wallpaper when the mobile device is in a screen locked state, wherein the image contains a scanning code, (c2) facilitate a financial transaction at the business location based on the scanning code without unlocking the mobile device, the financial transaction associated with a financial account of the primary user, and (c3) upon successful completion of the financial transaction, replacing the image with another image showing the scanning code and a balance left on the financial account of the primary user; (d) wherein power is conserved in the mobile device by not unlocking it at the business location to conduct the financial transaction, and (e) wherein each of the financial transaction is cloud-based, wherein a payment provider automatically covers a cost of a purchase associated with the financial transaction with issuer linked funds, and wherein the payment provider charges a cloud-linked user account in a card-not-present environment.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 1:
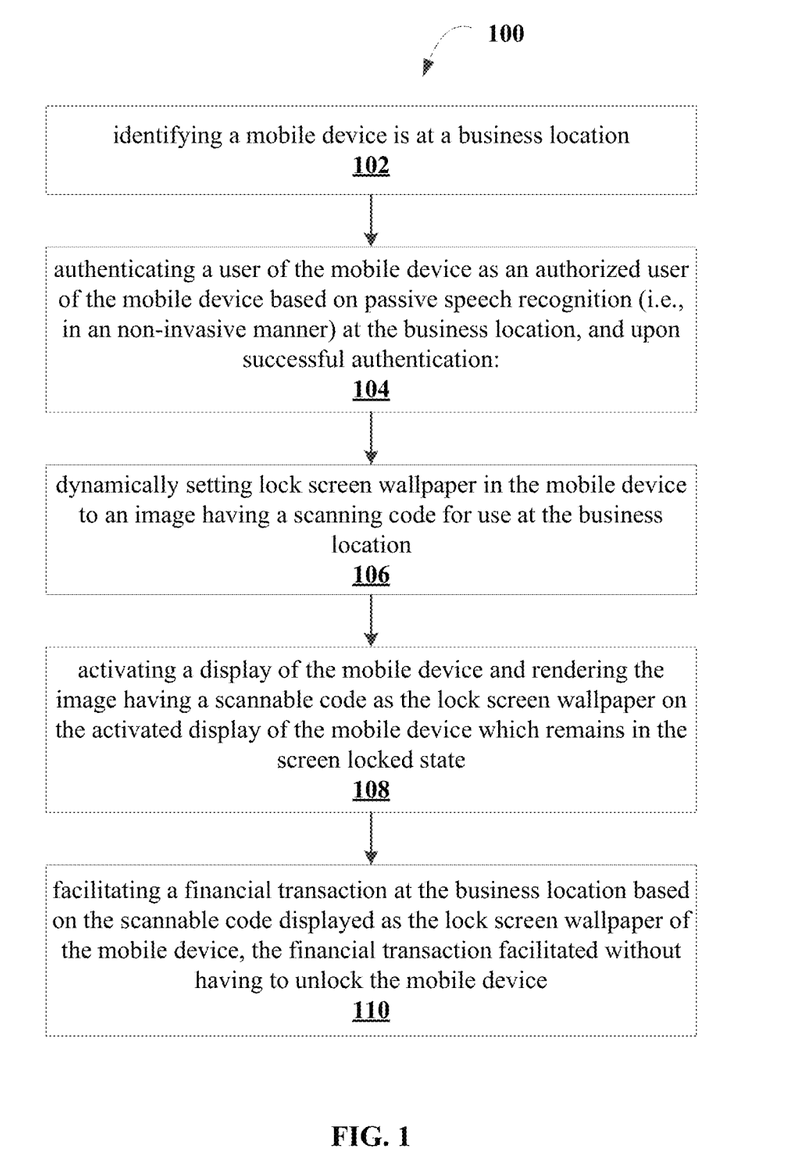
FIG. 1 illustrates an embodiment of the present invention to facilitate a financial transaction without unlocking a mobile device.

FIG. 1 illustrates an embodiment of the present invention which discloses method 100 to facilitate a financial transaction without unlocking a mobile device. In step 102, the mobile device is identified to be at a business location. In one embodiment, the mobile device is identified as being located at the business location based on GPS data received at the mobile device. In another embodiment, the mobile device is identified as being located at the business location based upon a near field communication (NFC) interaction with a device at the business location. For example, the device at the business location may be a NFC tag and the mobile device may interact with such a NFC tag to confirm that it is located at a particular business location. In yet another extended embodiment, the NFC tag is either integrated into a point-of-sale terminal or is attached to a point-of-sale terminal at the business location.

In another embodiment, the mobile device is identified as being located at the business location based on a RFID interaction with a device at the business location. For example, the device at the business location may be a RFID tag and the mobile device may interact with such a RFID tag to confirm that it is located at a particular business location. In yet another extended embodiment, the RFID tag is either integrated into a point-of-sale terminal or is attached to a point-of-sale terminal at the business location.

In yet another embodiment the mobile device is identified as being located at the business location based on a Bluetooth interaction with a device at the business location. For example, the device at the business location may be a point-of-sale terminal that can communicate via Bluetooth with the mobile device.

In step 104, the mobile device authenticates a user as an authorized user of the mobile device based on passive (in a non-invasive manner) speech recognition at the business location. It is important to note that in the preferred embodiment, the authentication of the user is done in a non-invasive manner, where the user is unaware that such an authentication is taking place. For example, while the user is at a point of sale terminal, the user may engage in a conversation with the cashier (while ordering food or drinks, for example) and the mobile device performs speech recognition of the user during such a detected conversation and authenticates the user as an authorized user of the mobile device. It should further be noted that while there is always a primary user associated with a mobile device, there may also be secondary users associated with the same mobile device. For example, the same mobile device may be used by a husband and wife, son or daughter, as the primary user may authorize such secondary users to be authorized users of the mobile device. A user of the mobile device may maintain a profile and corresponding speech recognition data to identify a plurality of such authorized users of the same mobile device.

Upon successfully authenticating an authorized user, in step 106 a processor in the mobile device dynamically sets a lock screen wallpaper in the mobile device to an image having a scanning code (e.g., a QR code, a barcode, etc.) for use at the business location the user is at. It is important to note that the lock screen wallpaper, which is displayed when the mobile device is in a locked state to conserve power, is updated, and not the home screen wallpaper, which is generally displayed when a mobile device is not in a locked state.

Figure 4:
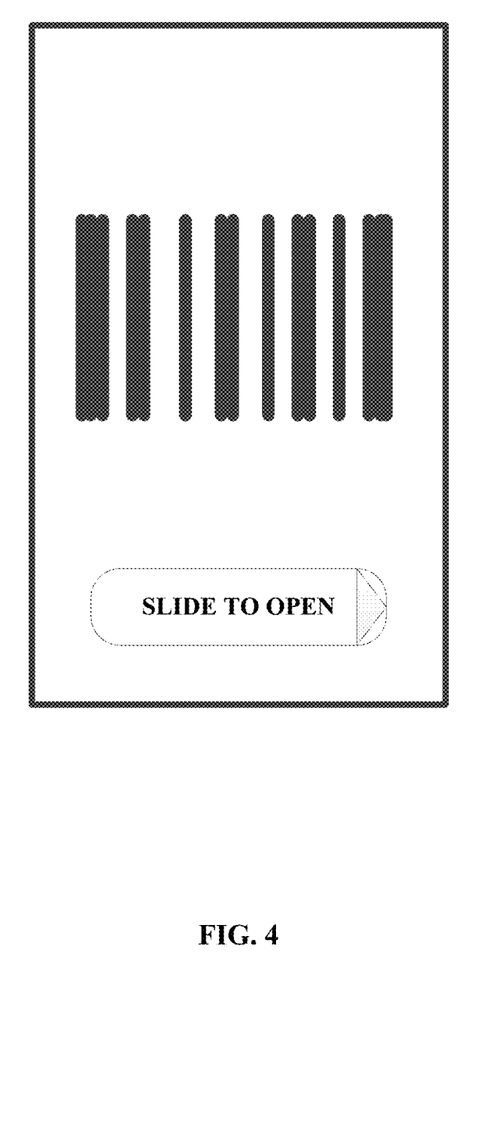
FIG. 4 depicts an example of such an image having the scannable code wherein the image is rendered as the lock screen wallpaper.

In step 108, a display of the mobile device is activated and the image having the scannable code is rendered as the lock screen wallpaper on the activated display of the mobile device which remains in the screen locked state. Such activation may be user initiated or triggered automatically (e.g., when the mobile device is proximate to a point of sale terminal). FIG. 4 depicts an example of such an image having the scannable code wherein the image is rendered as the lock screen wallpaper.

In step 110, a financial transaction is facilitated at the business location based on the scannable code displayed as the lock screen wallpaper of the mobile device, wherein such a financial transaction is facilitated without having to unlock the mobile device. For example, the attendant at the point of sale terminal may scan the scannable code displayed as the lock screen wallpaper of the mobile device and a financial transaction could be completed at the point of sale terminal for an item (or items) the user may wish to purchase at the business location.

Figure 5:
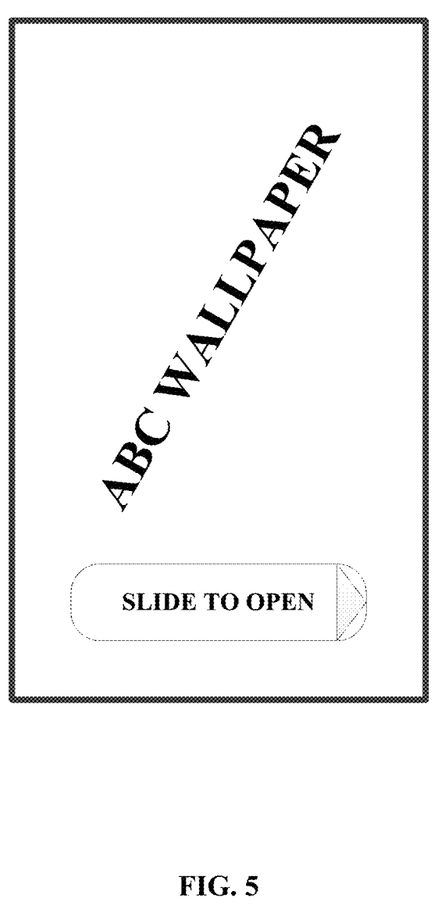
FIG. 5 depicts an example of a default lock screen wallpaper.
Figure 6:
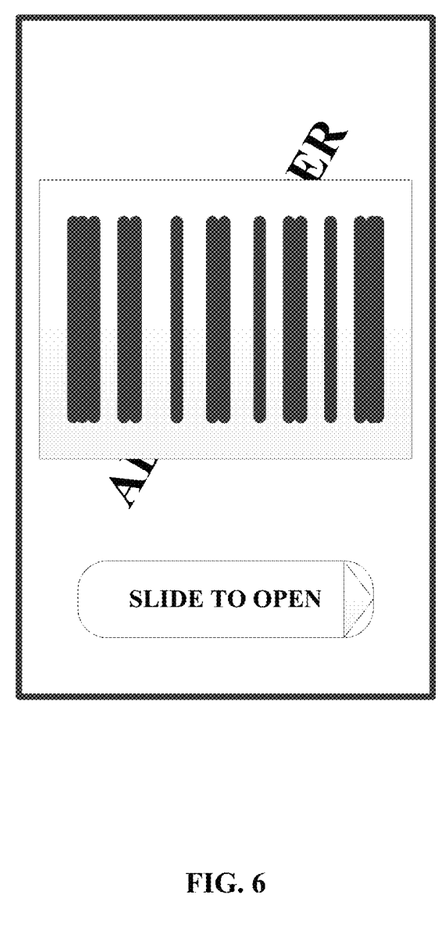
FIG. 6 depicts an example where the image having the scanning code is centered and partially covers the default lock screen wallpaper of FIG. 5.

In an alternative embodiment, the image having a scanning code (e.g., a QR code, a barcode, etc.) may be rendered in front of a default lock screen wallpaper (where it visually covers the entirety of the default lock screen wallpaper and looks like FIG. 4) or in front of a portion of the default lock screen wallpaper (see FIG. 5 for an example of a default lock screen wallpaper, and FIG. 6 for an example where the image having the scanning code is centered and partially covers the default lock screen wallpaper), where the default lock screen wallpaper is either a custom image previously set by the user of the mobile device or is the system default of the mobile device (the system default image for the lock screen wallpaper when the user has not previously set the lock screen wallpaper to a custom image). The point of sale terminal is able to scan the scannable code to complete a purchase at the business location.

In one embodiment, the method further comprises reverting the lock screen wallpaper to a default lock screen wallpaper (i.e., a lock screen wallpaper previously set by a user) upon either a successful completion of the financial transaction or upon the user leaving the premises of the business location.

In one embodiment, the financial transaction is associated with a financial account (e.g., an account associated with a credit card account, a gift card, a credit account associated with the business, etc.) and the method further comprises updating the lock screen wallpaper to another image showing a balance left on the financial account after successful completion of the financial transaction. After displaying the image showing the balance as the lock screen wallpaper, the mobile device may revert to a default lock screen wallpaper (i.e., a lock screen wallpaper previously set by a user) upon either the expiration of a pre-determined time (e.g., a few seconds after the display of the image showing the balance) or upon the user leaving the premises of the business location.

Figure 7:
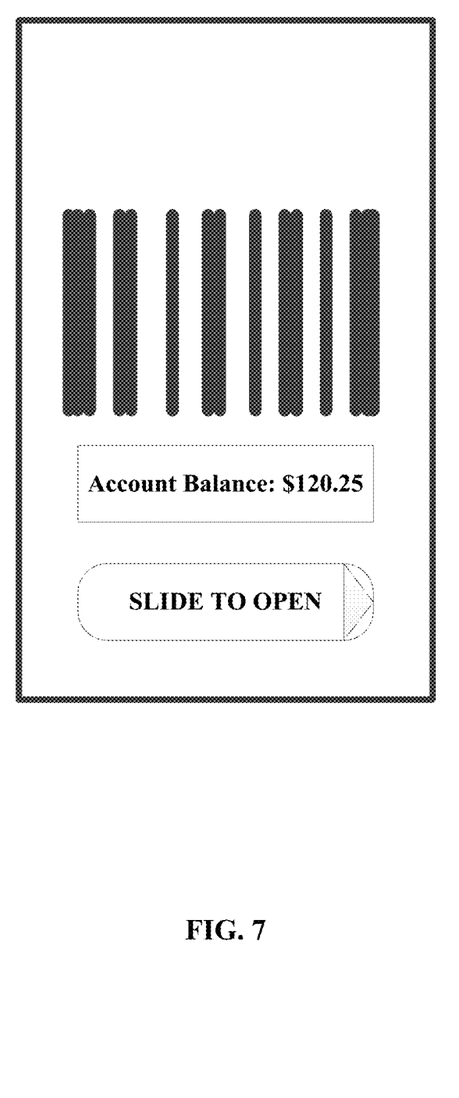
FIG. 7 depicts an example of an image showing the scanning code and an account balance.

In one embodiment, the image having a scanning code for use at the business additionally displays a balance associated with a financial account which is used during the financial transaction. Such an example is shown in FIG. 7 which depicts the scanning code and the balance as part of the lock screen image.

Figure 8:
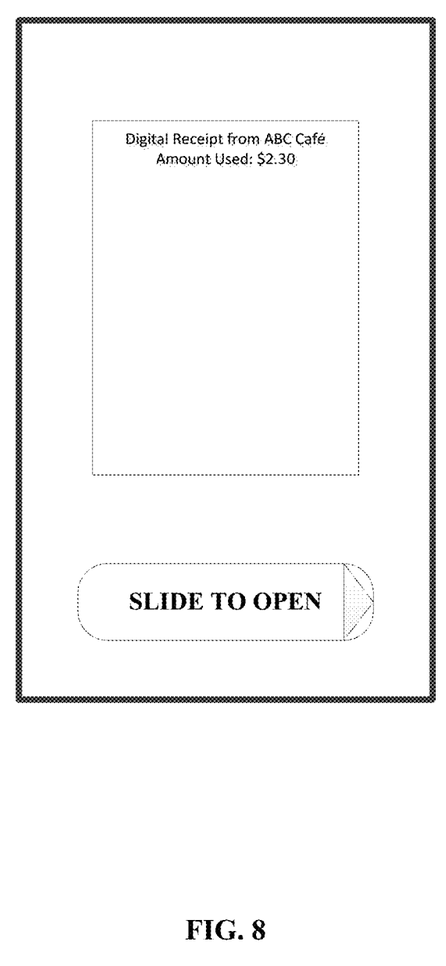
FIG. 8 depicts an example of a digital receipt shown as part of the lock screen background.

In one embodiment, after successful completion of the financial transaction, the lock screen wallpaper is updated to display a digital receipt as new lock screen wallpaper. Such an example is shown in FIG. 8. The digital receipt image may be received from a device at the business location like a point of sale terminal or may be received over a network such as the Internet or via the cellular network. After displaying the image showing the digital receipt as the lock screen wallpaper, the mobile device may revert to a default lock screen wallpaper (i.e., a lock screen wallpaper previously set by a user) upon either the expiration of another pre-determined time (e.g., a few seconds after the display of the image showing the digital receipt) or upon the user leaving the premises of the business location.

In one embodiment, the scannable code comprises user-defined customization data related to the financial transaction in addition to information required to perform the financial transaction. For example, the user may have previously stored data identifying order details associated with a drink (e.g., type of drink—coffee/espresso/cappuccino, syrup additives, number of pumps of syrup additives, type of milk to be used to make drink, etc.) or order details associated with a food item (type of toppings on a pizza, requested condiments, etc.) and this previously stored information regarding the order details may be encoded into the scannable code (at either the request of the user or is automatically identified via a profile storing what was previously ordered at the business location and is presented to the user for verification prior to being encoded as the scannable code), where the point of sale terminal may decode this information and the attendant at the point of sale terminal can review the order details. Such order details that may be encoded along with information required to perform a financial transaction may be useful in getting an order correct as it is directly from the user and is not based on the attendant at the point of sale terminal inputting such data, which by definition is error prone.

In one embodiment, the financial transaction is a cloud-based transaction, wherein a payment provider automatically covers the cost of a purchase with issuer linked funds and, in a separate transaction, the payment provider charging the purchaser's selected, cloud-linked account in a card-not-present environment to recoup its losses on the first transaction.

In one embodiment, the image having a scanning code for use at the business location is generated by a software running on the mobile device, wherein the software is associated with the business location.

Non-limiting examples of the mobile device include any of the following: a mobile phone, a tablet, a portable gaming device or a digital music player.

Figure 2:
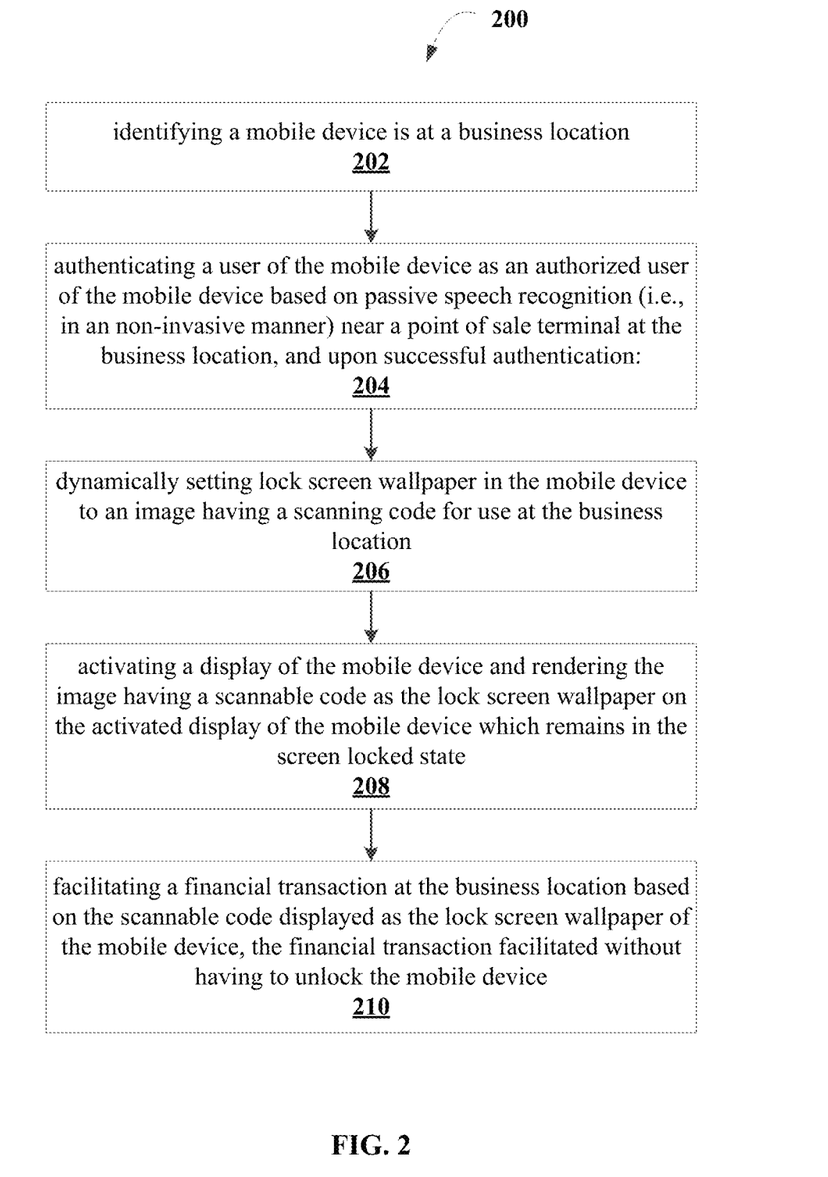
FIG. 2 illustrates another embodiment of the present invention to facilitate a financial transaction without unlocking a mobile device.

FIG. 2 illustrates another embodiment of the present invention's method to facilitate a financial transaction without unlocking a mobile device, wherein the method comprises the steps of: identifying the mobile device is at a business location (step 202); authenticating a user of the mobile device as an authorized user of the mobile device based on passive speech recognition (i.e., in a non-invasive manner) near a point of sale terminal at the business location (step 204), and upon successful authentication: dynamically setting lock screen wallpaper in the mobile device to an image having a scanning code for use at the business location (step 206); activating a display of the mobile device and rendering the image having a scannable code as the lock screen wallpaper on the activated display of the mobile device which remains in the screen locked state (step 208); and facilitating a financial transaction at the business location based on the scannable code displayed as the lock screen wallpaper of the mobile device, the financial transaction facilitated without having to unlock the mobile device (step 210).

The above-presented discussion with regards to FIG. 1 applies to FIG. 2, but it should be noted that in this embodiment, the speech recognition for authenticating a user is passively (i.e., non-invasively) done while the user speaks with the attendant at the point of sale terminal. For example, while ordering a food or drink, a user is going to have a conversation with the attendant of a point of sale terminal. The present invention leverages this scenario and performs voice recognition in a passive (i.e., non-invasive) manner without the user being aware of such voice recognition being performed.

Figure 3:
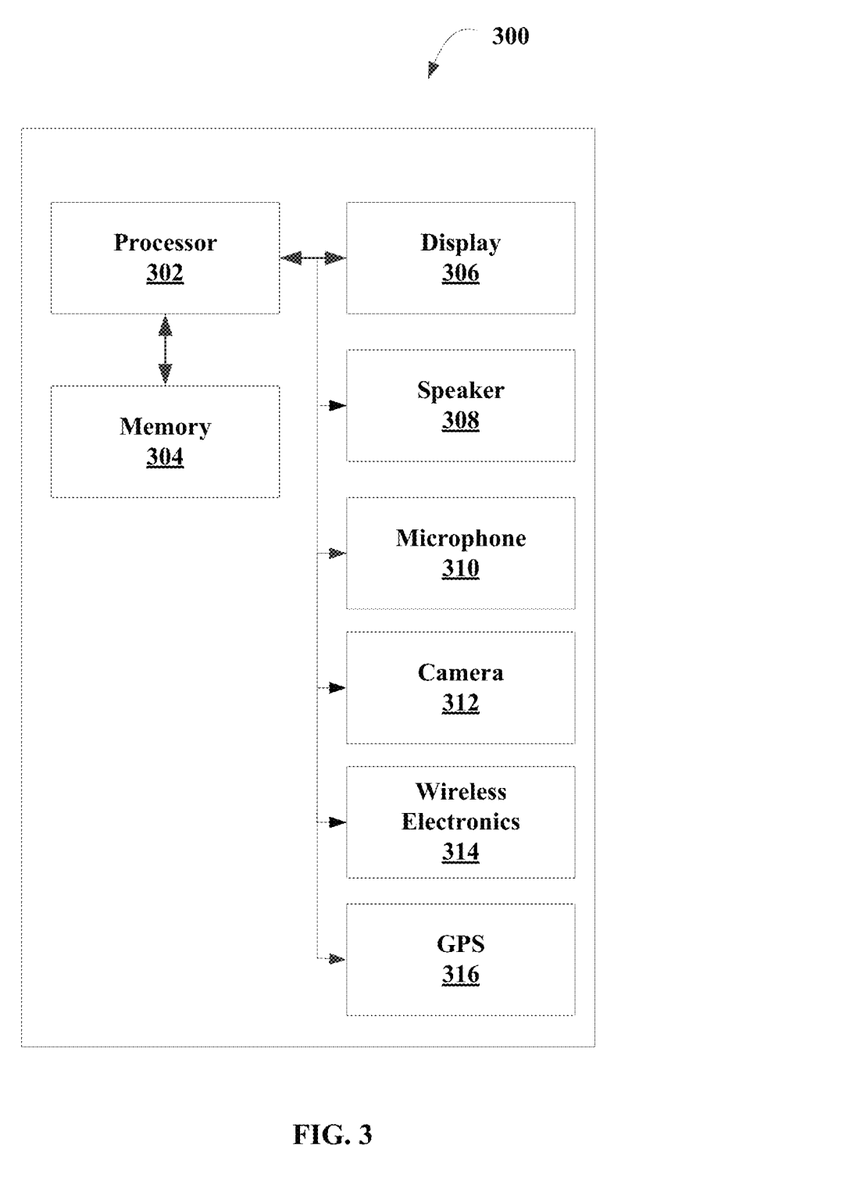
FIG. 3 depicts a non-limiting example of a mobile device according to the present invention.

FIG. 3 depicts a non-limiting example of a mobile device 300 according to the present invention. While select components (processor 302 memory 304, display 306 (e.g. a touch screen display), speaker 308, microphone 310, camera 312, wireless electronics 314 required for wireless communication, GPS unit 316) are shown as being part of the mobile device 300, it should be noted that these components are provided as a simplistic case scenario and other known components (such as, but not limited to, a Bluetooth module, a NFC module, a RFID module), may be present within the mobile device 300. Mobile device 300 comprises: a processor 302; a display 306; and memory/storage 304 storing computer readable programmable code, which when executed by the processor implements a method to facilitate a financial transaction without unlocking a mobile device, the memory/storage 304 comprising computer readable program code to: identify the mobile device 300 is at a business location (using for example, GPS 316); authenticate a user of the mobile device 300 as an authorized user of the mobile device based on passive (non-invasive) speech recognition at the business location (based on speech data received passively over microphone 310), and upon successful authentication: dynamically set lock screen wallpaper in the mobile device 300 to an image having a scanning code for use at the business location; activate the display 306 of the mobile device 300 and render the image having a scannable code as the lock screen wallpaper on the activated display 306 of the mobile device 300 which remains in the screen locked state; and facilitate a financial transaction at the business location based on the scannable code displayed as the lock screen wallpaper of the mobile device 300, the financial transaction facilitated without having to unlock the mobile device 300. It should be noted that the mobile device may include any of the following: a mobile phone, a tablet, a portable gaming device or a digital music player.

Additionally, the present invention provides for an article of manufacture comprising computer readable program code contained within implementing one or more modules to facilitate a financial transaction without unlocking a mobile device. Furthermore, the present invention includes a computer program code-based product, which is a storage medium having program code stored therein which can be used to instruct a computer/processor to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for an article of manufacture having non-transitory computer readable storage medium comprising computer readable program code executable by a processor to implement a method to facilitate a financial transaction without unlocking a mobile device, the non-transitory computer readable storage medium comprising: computer readable program code identifying the mobile device is at a business location; computer readable program code authenticating a user of the mobile device as an authorized user of the mobile device based on passive (in a non-invasive manner) speech recognition at the business location, and upon successful authentication: computer readable program code dynamically setting lock screen wallpaper in the mobile device to an image having a scanning code (e.g., a QR code, a barcode, etc.) for use at the business location; computer readable program code activating a display of the mobile device and rendering the image having a scannable code as the lock screen wallpaper on the activated display of the mobile device which remains in the screen locked state; and computer readable program code facilitating a financial transaction at the business location based on the scannable code displayed as the lock screen wallpaper of the mobile device, the financial transaction facilitated without having to unlock the mobile device.

The present invention also provides for an article of manufacture having non-transitory computer readable storage medium comprising computer readable program code executable by a processor to implement a method to facilitate a financial transaction without unlocking a mobile device, the non-transitory computer readable storage medium comprising: computer readable program code identifying the mobile device is at a business location; computer readable program code authenticating a user of the mobile device as an authorized user of the mobile device based on passive (i.e., in a non-invasive manner) speech recognition at a point of sale terminal at the business location, and upon successful authentication: computer readable program code dynamically setting lock screen wallpaper in the mobile device to an image having a scanning code for use at the business location; computer readable program code activating a display of the mobile device and rendering the image having a scannable code as the lock screen wallpaper on the activated display of the mobile device which remains in the screen locked state; and computer readable program code facilitating a financial transaction at the business location based on the scannable code displayed as the lock screen wallpaper of the mobile device, the financial transaction facilitated without having to unlock the mobile device.

CONCLUSION

A system, method and article of manufacture has been shown in the above embodiments for the effective implementation of facilitating a financial transaction without unlocking a mobile device. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, mobile environment, specific computing hardware, or specific mobile hardware.

The invention claimed is:

1. A method to conserve power in a mobile device comprising:
   (a) maintaining, in the mobile device, a profile storing authentication data associated with: (1) a primary user of a mobile device, and (2) at least one secondary user that is authorized to use the mobile device;
   (b) identifying the mobile device is at a business location;
   (c) passively authenticating the at least one secondary user based on the mobile device being at the business location, and upon successful authentication:
      (c1) displaying an image over a portion of a default lock screen wallpaper when the mobile device is in a screen locked state, wherein the image contains a scanning code,
      (c2) facilitating a financial transaction at the business location based on the scanning code without unlocking the mobile device, the financial transaction associated with a financial account of the primary user;
   (d) wherein power is conserved in the mobile device by not unlocking it at the business location to conduct the financial transaction, and
   (e) wherein the financial transaction is cloud-based, wherein a payment provider automatically covers a cost of a purchase associated with the financial transaction with issuer linked funds, and wherein the payment provider charges a cloud-linked user account in a card-not-present environment.

2. The method of claim 1, wherein said scanning code is any of the following: QR code, or a barcode.

3. The method of claim 1, wherein the identifying step in (b) is based on GPS location data.

4. The method of claim 1, wherein the mobile device is any of the following: a mobile phone, a tablet, a portable gaming device or a digital music player.

5. The method of claim 1, wherein the passive authenticating step in (c) comprises passive speech recognition.

6. The method of claim 1, wherein the identifying step in (b) is based upon a near field communication (NFC) interaction with a device at the business location.

7. The method of claim 6, wherein the device at the business location is an NFC tag.

8. The method of claim 6, wherein the device at the business location is a point-of-sale (POS) terminal.

9. The method of claim 1, wherein the financial account is any of the following: a credit card account, a gift card account, or a credit account associated with the business location.

10. The method of claim 1, wherein after step (c2), the method comprising replacing the image having the scanning code with another image showing the scanning code and a balance left on the financial account.

11. A mobile device comprising:
    a processor;
    a display;
    storage storing computer readable programmable code, which when executed by the processor implements a method to conserve power in the mobile device having a lock screen wallpaper, the storage comprising computer readable program code to:
    (a) maintain, in the mobile device, a profile storing authentication data associated with: (1) a primary user of a mobile device, and (2) at least one secondary user that is authorized to use the mobile device;
    (b) identify the mobile device is at a business location;
    (c) passively authenticate the at least one secondary user based on the mobile device being at the business location, and upon successful authentication:
       (c1) display an image over a portion of a default lock screen wallpaper when the mobile device is in a screen locked state, wherein the image contains a scanning code,
       (c2) facilitate a financial transaction at the business location based on the scanning code without unlocking the mobile device, the financial transaction associated with a financial account of the primary user;
    (d) wherein power is conserved in the mobile device by not unlocking it at the business location to conduct the financial transaction, and
    (e) wherein the financial transaction 1s cloud-based, wherein a payment provider automatically covers a cost of a purchase associated with the financial transaction with issuer linked funds, and wherein the payment provider charges a cloud-linked user account in a card-not-present environment.

12. The mobile device of claim 11, wherein the scanning code is any of the following: QR code, or a barcode.

13. The mobile device of claim 11, wherein the identify step in (b) is based on GPS location data.

14. The mobile device of claim 11, wherein the mobile device is any of the following: a mobile phone, a tablet, a portable gaming device or a digital music player.

15. The mobile device of claim 11, wherein the passive authenticate step in (c) comprises passive speech recognition.

16. The mobile device of claim 11, wherein the identify step in (b) is based upon a near field communication (NFC) interaction with a device at the business location.

17. The mobile device of claim 16, wherein the device at the business location is an NFC tag.

18. The mobile device of claim 11, wherein the financial account is any of the following: a credit card account, a gift card account, or a credit account associated with the business location.

19. The mobile device of claim 11, wherein after step (c2), the storage comprising computer readable program code to replace the image having the scanning code with another image showing the scanning code and a balance left on the financial account.

20. A mobile device comprising:
    a processor;
    a display;
    storage storing computer readable programmable code, which when executed by the processor implements a method to conserve power in the mobile device having a lock screen wallpaper, the storage comprising computer readable program code to:
    (a) maintain, in the mobile device, a profile storing authentication data associated with: (1) a primary user of a mobile device, and (2) at least one secondary user that is authorized to use the mobile device;
    (b) identify the mobile device is at a business location;
    (c) passively authenticate the at least one secondary user based on the mobile device being at the business location, and upon successful authentication:

(c1) display an image over a portion of a default lock screen wallpaper when the mobile device is in a screen locked state, wherein the image contains a scanning code,
(c2) facilitate a financial transaction at the business location based on the scanning code without unlocking the mobile device, the financial transaction associated with a financial account of the primary user, and
(c3) upon successful completion of the financial transaction, replacing the image with another image showing the scanning code and a balance left on the financial account of the primary user;
(d) wherein power is conserved in the mobile device by not unlocking it at the business location to conduct the financial transaction, and
(e) wherein the financial transaction 1s cloud-based, wherein a payment provider automatically covers a cost of a purchase associated with the financial transaction with issuer linked funds, and wherein the payment provider charges a cloud-linked user account in a card-not-present environment.

\* \* \* \* \*